United States Patent Office 3,531,556
Patented Sept. 29, 1970

3,531,556
BLOW MOLDING METHOD
Horst Mehnert, Berlin, Germany, assignor to Bekum, Berliner Kunststoff-Verarbeitung G.m.b.H., Berlin-Mariendorf, Germany
Filed Aug. 3, 1966, Ser. No. 569,885
Claims priority, application Germany, Nov. 27, 1965, M 67,443
Int. Cl. B29c 7/07, 23/00
U.S. Cl. 264—98                            5 Claims

ABSTRACT OF THE DISCLOSURE

A method of producing the neck portion of plastic bottles during a blow molding process by clamping an annular portion downwardly spaced from the open end of a parison from within and without and subsequently thereto axially compressing the material of the parison between the open end and the clamped annular portion thereof while supporting the internal surface of the parison above the clamped portion to cause the material to expand radially outwardly and to form an annular bead above the clamped portion.

---

The present invention relates to mass-production of plastic bottles or other hollow plastic articles by the so-called blow molding process. More particularly, the invention relates to improvements in a method and apparatus for shaping the neck portions of bottles or other receptacles consisting of synthetic plastic material.

It is well known to produce plastic bottles, canisters, vials and like hollow receptacles by the blow molding process. As a rule, a conventional blow molding apparatus comprises a plasticizer which extrudes successive blanks or parisons (in the form of tubes or strips) ready to be accommodated in the cavity of a blow mold. The mold is then closed and a blowing mandrel is introduced through the open end of the parison to admit compressed gas which expands the parison against the surface surrounding the mold cavity. The mandrel cooperates with the adjoining portions of the mold to calibrate the outlet or neck portion of the resulting hollow plastic article. Such calibration is satisfactory when the wall thickness of the neck portion need not exceed the wall thickness of the remainder of the bottle but is not satisfactory if the neck portion is to be formed with an annular bead whose thickness exceeds considerably the wall thickness of the parison and which is provided to retain a so-called crown cork or a like closure. Also, the bead must be shaped and its surfaces finished with a relatively high degree of precision in order to prevent leakage when the cork is applied therearound.

Accordingly, it is an important object of the present invention to provide a novel method of shaping neck portions or outlets of plastic bottles and similar receptacles according to which each of a series of successive neck portions can be shaped with the same degree of precision and by resorting to a very simple, compact and reliable apparatus.

Another object of the invention is to provide a method of the just outlined characteristics according to which such shaping of neck portions or outlets is incident to the blow molding operation so that no additional time is needed to form the beads.

A further object of the invention is to provide a method of the just outlined characteristics which may be resorted in the production of relatively small or relatively large bottles or like hollow plastic bodies and according to which the provision of enlargements or beads on neck portions or outlets requires relatively minor but unobvious modifications in the design of presently known blow molding apparatus.

An ancillary object of the invention is to provide a method of providing the neck portions of bottles with enlargements or beads which are free of voids and of automatically and cleanly separating from such enlargements any surplus of plastic material.

An additional object of the invention is to provide a method of the above outlined characteristics according to which a parison which has been introduced into the cavity of a blow mold is held and supported in a novel way.

Another object of the invention is to provide a method of shaping the neck portions of plastic bottles or the like in such a way that each such neck portion is formed with an annular enlargement or bead whose thickness may exceed several times the wall thickness of the original parison.

A further object of the invention is to provide a method of forming the neck portions of plastic bottles with annular beads or analogous enlargements and of simultaneously finishing the surfaces of such beads with a degree of precision which is not attainable by resorting to presently known blow molding processes.

An additional object of the instant invention is to provide a blow molding apparatus which may be utilized in practicing the above-outlined method and to construct and assemble the apparatus in such a way that the penetration of the blowing mandrel into a parison which is accommodated in the cavity of a blow mold cannot bring about uncontrolled axial displacements of the parison.

A concomitant object of the invention is to provide a blow molding apparatus which can be converted for the production of different types of hollow plastic articles.

Briefly stated, one feature of my invention resides in the provision of a method of producing hollow plastic articles by the blow molding process, particularly to a method of shaping the neck portions of plastic bottles and like receptacles or containers. The method comprises the steps of supporting the internal surface of a deformable open-ended tubular parison along a section of the internal surface which extends inwardly from the open end of the parison, subjecting an annular portion of the external surface of the parison (located opposite the aforementioned section of the internal surface and spaced from the open end of the parison) to radially inwardly directed compressive or clamping stresses so that, in the region of such annular portion, the material of the parison is clamped from within and from without to be held against undesirable axial displacement, and subjecting the material of the parison between its open end and the aforementioned annular portion of the external surface to deforming or upsetting stresses acting in the axial direction toward the clamping zone so that the thus deformed material expands radially outwardly while its length decreases to form an annular bead which is adjacent to the clamped portion of the external surface.

The internal surface of the parison is preferably supported or propped by the peripheral surface of a customary blowing mandrel which can be coupled to or cooperates with a suitable upsetting element, for example, an annular ram which may be mounted for movement with or relative to the mandrel.

The novel features which are considered as characteristic of the invention are set forth in particular in the appended claims. The improved blow molding apparatus itself, however both as to its construction and its mode of operation, together with additional features and advantages thereof, will be best understood upon perusal of the following detailed description of certain specific embodiments with reference to the accompanying drawings, in which:

Figure 1:
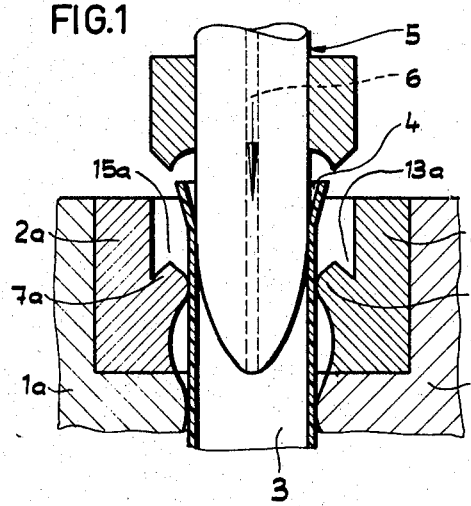
FIG. 1 is a fragmentary axial section through the mold of a blow molding apparatus which embodies one form of my invention, the blowing mandrel being shown in a first intermediate position.
Figure 2:
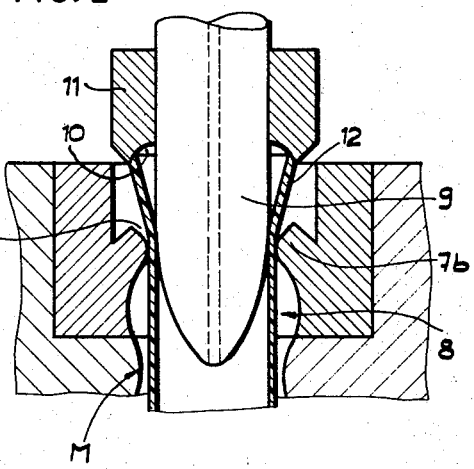
FIG. 2 is a similar fragmentary axial section but showing the blowing mandrel in a second intermediate position.
Figure 3:
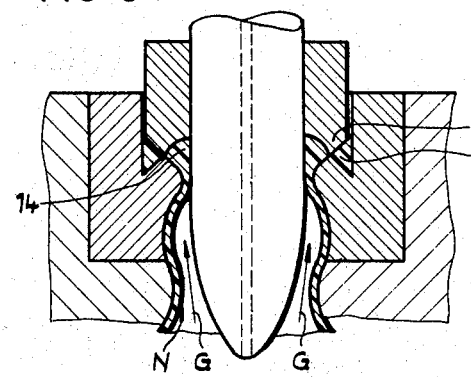
FIG. 3 is another fragmentary axial section but showing the blowing mandrel and the upsetting ram in their lower end positions.

Referring first to FIGS. 1 to 3, there is shown a portion of a blow molding apparatus which is utilized in the production of plastic bottles. The neck portion N of each bottle is to be provided with an annular bead 14 which is shown in FIG. 3 and is of the type normally provided on bottles which can be sealed by means of so-called crown corks often seen on bottles containing fruit juice, beer and similar beverages. The thickness of the bead 14 exceeds the thickness of the tubular parison 3 the upper portion of which is shown in FIG. 1. This parison is extruded in conventional fashion by resorting to a plasticizer which conveys plasticized material through the orifice of a nozzle to discharge a continuous tube which is severed at regular intervals by means of a hot wire or the like to yield a succession of parisons 3. Each successively formed parison is then introduced into the space between a pair of mold sections 1a, 1b which together form a blow mold and may be moved to closed positions shown in FIGS. 1 to 3 in which they define between themselves a mold cavity M. This cavity accommodates the major lower part of the parison 3 and the latter is thereupon expanded by compressed gas which is introduced through the axial bore 6 provided in a vertically reciprocable blowing mandrel 5. The lower end of the parison 3 is sealed by conventional pinching edges (not shown) which are provided on the mold sections 1a, 1b and move toward each other when the sections 1a, 1b are moved against each other by means of hydraulic or pneumatic cylinder and piston units or like reciprocating devices.

The upper portions of the mold sections 1a, 1b are respectively provided with substantially semicylindrical inserts 2a, 2b which surround the uppermost portion 12 of the parison 3 when the blow mold is closed. In accordance with an important feature of my invention, the inserts 2a, 2b are respectively provided with arcuate clamping portions 7a, 7b which form a complete ring when the blow mold is closed and then engage an annular portion of the external surface of the parison in a region which is spaced from the open upper end 4. The blowing mandrel 5 is introduced into the open end 4 so that its peripheral surface supports a section of the internal surface of the parison 3 extending from the open end 4 and at least to the region of the ring formed by the arcuate clamping portions 7a, 7b. In other words, an annular portion of the parison 3 is clamped from within (by the mandrel 5) and from without (by the ring including the clamping portions 7a, 7b). The bore 6 of the mandrel 5 is preferably connected to a source of compressed air. The peripheral surface of the mandrel 5 will calibrate the bead 14 from inside, i.e., the internal diameter of the finished bead will be identical with the external diameter of the respective portion of the mandrel. The outside of the neck N will be calibrated by the inserts 2a, 2b and by an annular upsetting member or ram 11 which resembles an annulus and is preferably fixedly secured to the mandrel so that it moves therewith.

The uppermost zone 8 of the mold cavity M will accommodate that portion of the parison 3 which is located immediately below the clamping portions 7a, 7b. The mandrel 5 can admit compressed gas prior to actual formation of the bead 14 so that the gas issuing from the lower end of the bore 6 expands the parison radially and urges the material of the parison against the surface surrounding the zone 8 as shown in FIG. 3. The directions in which the gas penetrates between the tip of the mandrel 5 and the adjoining material of the parison 3 are indicated by arrows G.

The neck calibrating portion 9 of the mandrel 5 has a diameter which may equal the internal diameter of an undeformed parison. The internal diameter of the ring formed by the clamping portions 7a, 7b is then somewhat smaller than the external diameter of the parison to make sure that the parison is actually clamped between the inserts 2a, 2b and the calibrating portion 9.

The underside of the ram 11 has an annular groove 10 bounded by a concave surface whose configuration will determine the outline of the top face on the bead 14. That part of the ram 11 which surrounds the groove 10 forms an annular knife or cutting edge 15 (see FIG. 3) which will separate the surplus of plastic material when the ram 11 is caused to move from the position of FIG. 1 to that shown in FIG. 3 to thereby upset the uppermost portion 12 of the parison 3 and to force such portion into a second annular groove 13 defined by the arcuate portions 7a, 7b directly opposite the groove 10. As shown in each of FIGS. 1 to 3, that part of the ring formed by the clamping portions 7a, 7b which surrounds the lower groove 13 is also provided with an annular cutting edge or knife 15a which serves as a counterknife for the knife 15 and cooperates therewith to form a clean cut and to fully separate all surplus material from the bead 14. Such surplus material is denoted in FIG. 3 by the reference numeral 16.

The operation of the blow molding apparatus whose parts are shown in FIGS. 1 to 3 is as follows:

In the first step, the blow mold including the sections 1a, 1b is moved below the extrusion orifice (not shown) of the plasticizer. The sections 1a, 1b are moved apart and the freshly extruded parison 3 enters the space between such mold sections. The mold is then closed by moving the sections 1a, 1b to the positions shown in FIG. 1 whereby the aforementioned pinching edges in the lower portions of the sections 1a, 1b pinch and seal the lower end of the parison. The parison 3 is then separated from the leading end of the next-following parison and the mold (which is now closed) is shifted into registry with the blowing mandrel 5 which is maintained in its upper end position. The clamping portions 7a, 7b form a ring which bears against the external surface of the parison 3 in a region spaced from the open upper end 4, i.e., at the lower end of the uppermost portion 12. The mandrel 5 is thereupon caused to descend first to the position shown in FIG. 1 whereby its calibrating portion 9 penetrates into the uppermost portion 12 and the peripheral surface of the portion 9 props or supports the uppermost portion 12 from the inside opposite the clamping portions 7a, 7b (see FIG. 2) even before the ram 11 engages the open upper end 4 of the parison. The parison cannot be shifted by the mandrel 5 because its external surface is clamped by the portions 7a, 7b which then form the aforementioned ring whose internal diameter is slightly less than the external diameter of the parison.

The bore 6 can admit compressed gas even before the mandrel 5 reaches the lowermost position of FIG. 3 so that the gas penetrates between the calibrating portion 9 and the surrounding portion of the parison 3 to expand the plastic material in the upper zone 8 of the mold cavity M. Such expansion by compressed gas (arrows G in FIG. 3) also contributes to retention of the parison in requisite axial position because the external surface of the deformed parison portion bears against the surface bounding the zone 8 and resists downward movement of the uppermost portion 12 so that the latter is converted into the bead 14 which fills the grooves 10 and 13. The surplus 16 is severed by the knives 15, 15a and is ejected or falls out when the mold is opened subsequent to completion of the blowing operation. The ram 11 insures that the grooves 10 and 13 are completely filled with plastic material so that the bead 14 is freed of voids. The maximum thickness of the bead 14 may exceed several times the thickness of the undeformed portion 9.

It is clear that the molding apparatus of FIGS. 1 to 3 will operate properly if one of the knives 15, 15a is replaced by a flat surface which serves as an anvil for the other knife when the ram 11 descends to the position of FIG. 3. The upper parts of the inserts 2a, 2b define an annular space 13a which receives the surplus 16 when the latter is separated from the bead 14.

If desired, the diameter of the calibrating portion 9 can exceed the internal diameter of the undeformed parison so that, at the time the calibrating portion 9 begins to penetrate into the space surrounded by the clamping portions 7a, 7b, the mandrel 5 expands the parison and clamps it against the portions 7a, 7b.

Figure 4:
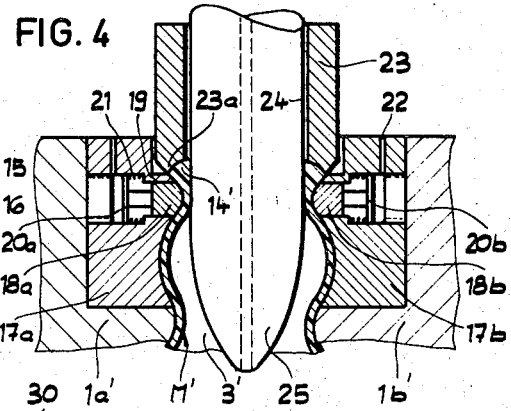
FIG. 4 is a fragmentary axial section through the mold of a modified blow molding apparatus wherein the clamping action upon the parisons may be adjusted.

FIG. 4 illustrates a portion of a modified blow molding apparatus wherein the clamping action upon an annular portion of the external surface of the parison 3' can be selected at will. The mold sections 1a', 1b' are provided with inserts 17a, 17b which accommodate radially movable clamping portions 18a, 18b. Each of these clamping portions 18a, 18b may consist of two or more arcuate components which are normally biased by helical expansion springs 21 tending to move them radially outwardly and away from the external surface of the parison 3'. Each clamping portion 18a, 18b (or each arcuate component of such clamping portion) constitutes the head of a piston 20 which is reciprocable in a radially extending cylinder chamber 20a. These chambers can receive hydraulic or pneumatic fluid through bores 22 which are provided in the inserts 17a, 17b.

When the parison 3' is properly accommodated in the mold cavity M', the blowing mandrel 25 penetrates into the space between the clamping portions 18a, 18b which are biased apart by the springs 21. The operator then admits fluid through the bores 22 so that the fluid pressure overcomes the bias of the springs 21 and moves the clamping portions 18a, 18b against the adjoining annular portion of the external surface on the parison 3'. The closing of the ring formed by the clamping portions 18a, 18b can be triggered automatically, for example, in response to downward movement of the blowing mandrel 25 through a predetermined distance. The mandrel 25 thereupon admits compressed gas which expands the parison in the zone directly below the clamping portions 18a, 18b to further impede downward displacement of the parison in response to deeper penetration of the mandrel 25 and/or in response to downward movement of the ram 23. This ram is movable independently of the mandrel 25 and can be shifted by mechanical, pneumatic, hydraulic or electromagnetic means. The movability of the ram 23 with reference to the mandrel 25 is indicated in FIG. 4 by an annular gap 24 surrounding the periphery of the mandrel. The ram 23 is provided with an annular knife 23a which severs the surplus of plastic material by moving against a flat anvil which forms part of the inserts 17a, 17b.

The blow molding apparatus of FIG. 4 may be provided with an adjustable valve which controls the admission of fluid through the broes 22 so that the clamping action of the portions 18a, 18b can be adjusted whenever necessary. The numerals 19 denote in FIG. 4 a pair of shoulders which constitute retainers for the springs 21. Admission of fluid through the bores 22 can take place prior to, during, or subsequent to movement of the mandrel 25 to the position shown in FIG. 4.

In mass production of plastic bottles and like receptacles by a blow molding process, the movements of mold sections to and from open positions, the movements of the blowing mandrel to and from calibrating position and the movements of the ram to and from upsetting position take place at such a speed that the exact sequence of movements of such parts is hardly discernible with the naked eye. The inward movement of clamping portions 18a, 18b into clamping engagement with the external surface of the parison 3 is relatively small, for example, in the range of one or more tenths of a millimeter.

The main difference between the apparatus of FIGS. 1–3 and FIG. 4 is seen to reside in that the clamping action of the ring formed by the clamping portions 18a, 18b may be regulated and also that the mandrel 25 need not move axially at the time the ram 23 performs a downward stroke to form the bead 14'. In the apparatus of FIGS. 1 to 3, the periphery of the calibrating portion 9 invariably moves downwardly while the ram 11 upsets the topmost portion 12 of the parison 3 because the mandrel 5 is compelled to share all axial movements of the ram.

Figure 5:
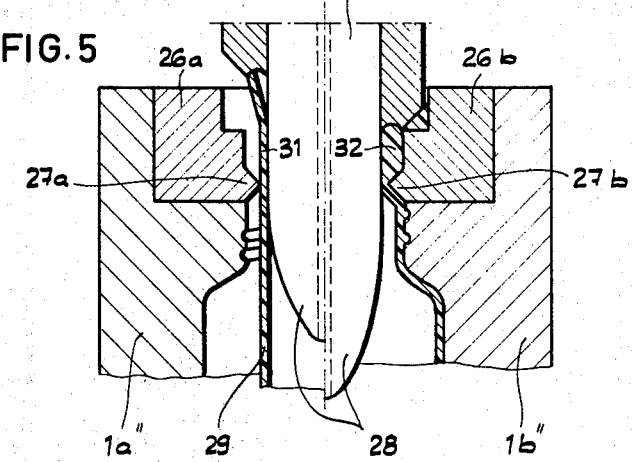
FIG. 5 is a fragmentary axial section through the mold of a third blow molding apparatus which is similar to the apparatus of FIGS. 1 to 3.

Referring finally to FIG. 5, there is shown a portion of a blow molding apparatus which includes mold sections 1a'', 1b'', and inserts 26a, 26b having rather sharp or pointed clamping portions 27a, 27b. The left-hand part of FIG. 5 shows the blowing mandrel 28 in an intermediate position before the ram 30 begins to upset the uppermost portion 31 of the parison 29. The clamping action of the portions 27a, 27b and of the peripheral surface of the mandrel 28 is sufficient to prevent downward displacement of the parison 29, especially since the mandrel can admit compressed gas which flows in the direction indicated the arrow G and expands the parison below the clamping portions 27a, 27b even before the ram 30 descends to the position shown in the right-hand portion of FIG. 5. The thickness of the bead 32 shown in this right-hand portion of FIG. 5 can exceed many times the thickness of the parison 29 prior to deformation.

Rapid penetration of the mandrel 5, 25 or 28 into the open upper end of the parison will invariably result in entrapment of soime air between the peripheral surface of the calibrating portion and the internal surface of the parison. Such entrapped air can be allowed to escape through a channel or gap which is preferably provided between the mandrel and the ram. For example, the gap 24 shown in FIG. 4 can be used to allow for escape of entrapped air.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a method of producing hollow plastic articles by the blow molding process, particularly in a method of producing the neck portions of plastic bottles and like receptacles, the steps of closing a blow mold about a deformable open ended tubular parison; subsequently supporting and calibrating the internal surface of the parison while the latter is in said closed mold along a section of such internal surface which extends inwardly from the open end of the parison and subjecting an annular portion of the external surface of the parison of an axial length which is only a fraction of the length of the neck portion to be formed and located opposite said section and spaced from said open end, to radially directed compressive stresses so that the parison material is clamped only in the region of said annular portion from within and from without and thereby held against axial displacement; pneumatically expanding the parison by introducing compressed fluid into the parison to the side of the clamped portion which is distant from the open end of said parison only after said annular portion has been clamped; and subjecting the inwardly supported parison material between said open and said annular portion to axial deforming stresses acting in direction toward said annular portion so that the thus deformed material expands only radially outwardly while its length decreases to form an annular bead adjacent to said annular portion.

2. The steps as set forth in claim 1, wherein said section of the internal surface of the parison is supported by the periphery of a blowing mandrel and further comprising the step of moving the blowing mandrel axially of the parison simultaneously with the formation of said annular bead.

3. The steps as set forth in claim 1, wherein said section of the internal surface of the parison is supported by the periphery of a blowing mandrel and wherein the mandrel is held against axial movement with reference to the parison during the formation of said annular bear.

4. The steps as set forth in claim 1, wherein the parison material between said open end and said annular portion contains a surplus over that required for the formation of said bead, and further comprising the step of separating the surplus from the bead.

5. The steps as set forth in claim 1, wherein the internal surface of the parison is supported by a blowing mandrel and said annular portion is subjected to compressive stresses by relatively movable sections of the blow mold.

References Cited

UNITED STATES PATENTS

| | | | |
|---|---|---|---|
| 2,890,483 | 6/1959 | Soubier | 264—98 |
| 3,410,937 | 11/1968 | Winchester | 264—98 |
| 3,224,038 | 12/1965 | Budesheim | 18—5 |
| 3,278,664 | 10/1966 | Langecker | 264—98 |
| 3,412,187 | 11/1968 | Fogelberg | 264—98 |

FOREIGN PATENTS 276,980  12/1964  Australia.

ROBERT F. WHITE, Primary Examiner

R. H. SHEAR, Assistant Examiner

U.S. Cl. X.R.

18—5